Nov. 24, 1936.  J. F. SCHAFFNER  2,061,777
LATHE
Filed July 24, 1935
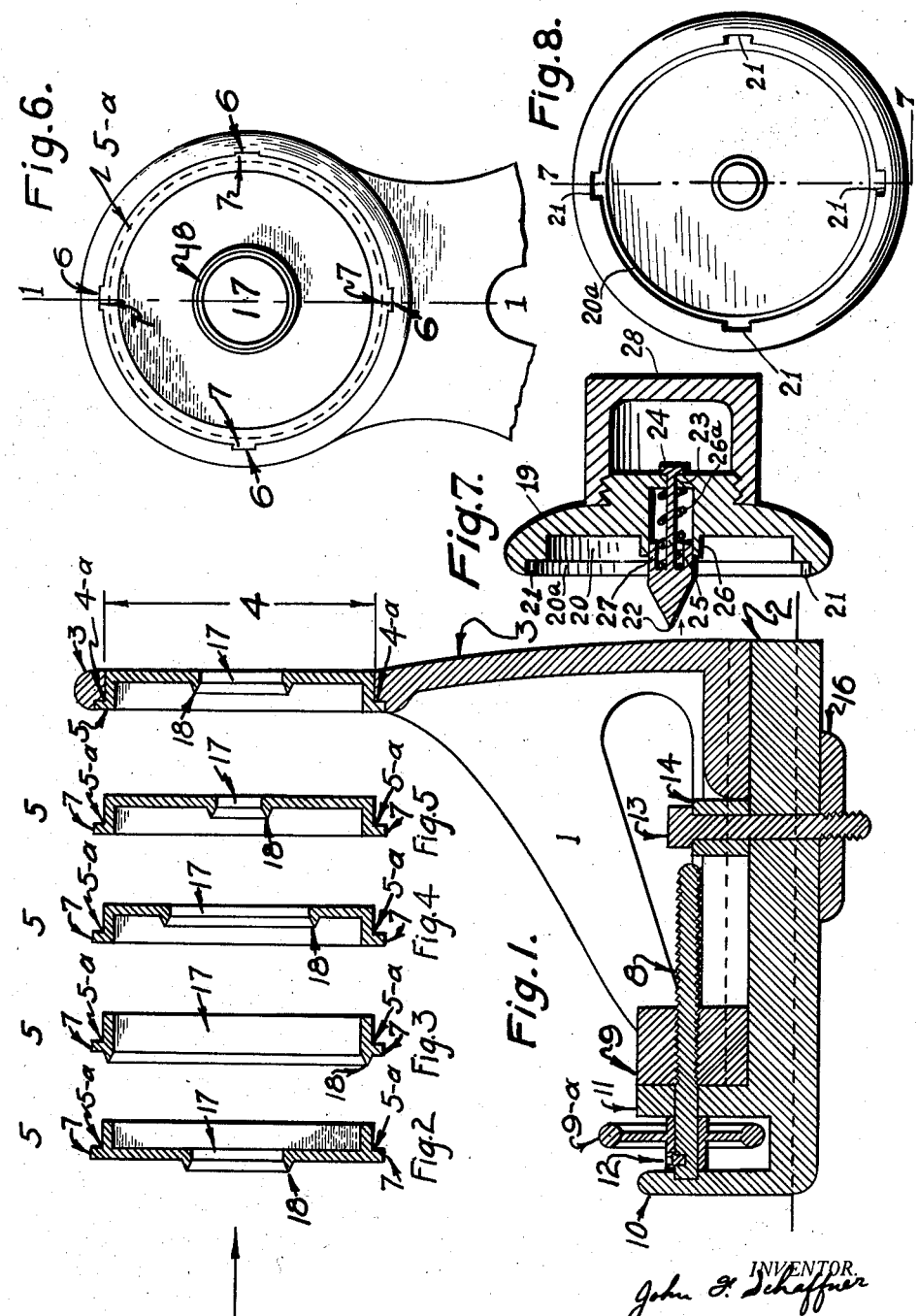
INVENTOR.
John F. Schaffner
BY Nathan Comstock
ATTORNEY.

Patented Nov. 24, 1936

2,061,777

UNITED STATES PATENT OFFICE 2,061,777

LATHE

John Fredrick Schaffner, Arcadia, Wis.

Application July 24, 1935, Serial No. 32,925

4 Claims. (Cl. 142—55)

My invention relates to lathes and has special reference to lathes of the type used for turning wood and analogous materials; and the objects of my improvement are, first to provide means for boring the work; second to provide an auxiliary tailstock for holding the work while it is being bored; third to provide an improved center; fourth to provide an apertured center through which the boring may be effected; fifth to provide means for centering the work; sixth to provide a center with an annular track upon which the work rotates; seventh to provide a center with a V-shaped annular track upon which the work rotates; eighth to provide a lathe in which the boring may be done by a tool upon the tailstock or upon a tool carriage or rest; ninth to provide a lathe which is specially adapted for boring stock or work which has been previously turned; tenth to provide a lathe in which boring of wooden and analogous turnings may be accurately done and without danger of spoiling the stock, and with safety.

I attain these objects and other objects and advantages by the mechanism illustrated in the accompanying drawing, in which—

Figure 1, is a sectional elevation of the auxiliary tailstock on the line 1—1, of Figure 6; Figures 2, 3, 4 and 5, are sections taken axially through a series of centers adapted for use in connection with the auxiliary tailstock; Figure 6, is an elevation of a fragment of the auxiliary tail-stock with a center in position therein viewed from the head-stock; Figure 7 is a section of the centering device taken on the line 7—7 of Figure 8; and Figure 8 is an elevation of the centering device looking in the direction of the arrows.

Similar numerals refer to similar parts throughout the several views.

The auxiliary tail-stock 1 is adjustably secured upon the bed of the lathe, not shown, between the head-stock and tail-stock, and comprises the base 2, upon which is mounted the upwardly projecting arm 3, provided with a stepped aperture 4, the center of which is in alignment with the centers of the lathe, and is adapted to receive any one of a series of centers 5, which fit closely within the aperture 4 and held against rotation therein by lugs 7 which fit within recesses 6 in the arm 3. The aperture 4 is stepped as shown in Figure 1, and the step or shoulder 4a receives the thrust of the flange 5a upon the center, and prevents its movement away from the head of the lathe.

The centers 5 are provided in a series appropriate to the number of different sizes of apertures which it is desired to bore. In the drawing a series of five centers is shown, but any suitable or desired number may be provided. These centers are each formed with a central aperture 17 extending through the center 5. Surrounding each aperture 17 with its extreme inner edge coinciding with the edge of the aperture is a V-shaped annular track 18 upon which the work is centered and turns, while the center is held against rotation by the lugs 6. The base 2 of the auxiliary tail-stock 1, is secured to the bed of a lathe, not shown, by means of the bolt 13 passing through the collar 14 and the base 2, and screw-threadedly engaging the clamp bar 16. The arm 3 is mounted upon the base 2 and adjustable longitudinally thereon by means of the screw 8, threaded through the part 9 of the arm 3. The screw 8 is rotatably mounted in the lugs 10 and 11 upon the base 2, and may be rotated by the hand wheel 9A, fitting between the lugs and secured to the screw 8, by the set screw 12.

The centering device as shown in Fig. 7, comprises the circular head 19, provided with a suitable stepped recess 20, which snugly fits the outside of the centers 5. The shoulder 20a of the recess 20 abutting the flange 5a of the center 5 takes the thrust of the center as it is driven into the work. The recess 20 is also provided at its outer edge with recesses 21, into which the lugs 6 of the center 5 fit and hold it against rotation. A conical center 22 is slidably supported by a tail-piece 23, passing through the center of the head 19. The tail-piece 23 is headed at 24 to prevent its separation from the head 19. A recess 25 at the center of the head 19, is provided with an annular outwardly projecting skirt 26 in which the center 22 slidably fits. A coiled spring 26a fitting within a recess 27 in the center 22 surrounds the tail-piece 23 and bears against the bottom of the recess 25 and serves to yieldably hold the center 22 extended. A cap or buffer member 28 which is adapted to be struck by a mallet to drive the annular centering ring into the work is screw threadedly secured to the head 19.

In operation of my invention a center 5 having an aperture appropriate to the size of the hole to be bored is placed in the centering device, and the center 22 centered upon the work and a sharp blow is struck with a mallet upon the cap 28 and the V-shaped annular track of the center driven into the work. The center is then put in the auxiliary tail-stock and the work placed in the lathe, and the auxiliary tailstock with the center therein adjusted so that the work or stock will rotate freely upon the V-shaped annular track of the center. The lathe is then operated and suitable boring tools supported either upon the carrage or tool rest, or by the main tail-stock are fed against the work through the aperture in the center and the desired bore produced.

By the use of my invention one is enabled to accurately and safely bore holes in turned stock on the lathe, and haphazard work through the head-stock is eliminated; holes for dowel-hole joints can be easily and accurately made, and long slender turnings can be made with a minimum amount of vibration, by making the spindle in sections and joining them.

My invention contemplates the use of any of the well known and customary means for taking up the thrust of the centers against the auxiliary tail-stock and the prevention of their rotation therein, instead of the stepped recess and flange and the lugs and recesses shown.

While specific structures have been shown and described in the carrying out of my invention, they are to be understood, as illustrative, and my invention limited only by the state of the art.

I claim:

1. In a centering device for lathes, a head provided with a stepped recess adapted to receive and hold a lathe center having a central aperture, said head provided with a recess at its center having a projecting annular skirt surrounding the same, a center for the centering device slidably supported by said skirt and provided with a tail piece slidably extending through said head, a head mounted on said tail piece for securing it to the first head, a spring interposed between the center for the centering device and the first head for holding the center for the centering device extended, and a cap on the head.

2. The combination in a lathe of an auxiliary tail-stock comprising a base member, means for adjustably securing the auxiliary tail-stock to the bed of the lathe, an arm adjustably mounted on the base, means for adjusting said arm on the base, said arm provided with a stepped aperture centrally aligned with the centers of the lathe and having peripheral recesses and a center of relatively short length as compared with its diameter having a central aperture and a V-shaped projecting annular ring upon which the work rotates and is supported and a flange provided with lugs mounted in said arm and held against rotation therein by the engagement of said lugs in the recesses and against longitudinal movement by the engagement of the flange and step and its bearing against the work.

3. In a centering device for lathes, a head adapted to receive and hold a lathe center having a central aperture, said head provided with a recess at its center having a projecting annular skirt surrounding the same, a center for said centering device yieldably supported in said skirt and provided with an extension slidably passing through said head, means on said extension for securing it in the head, resilient means interposed between the center for the centering device and the head for holding the center extended, and a cap on the head.

4. The combination in a lathe of an auxiliary tail-stock comprising a base member, means for adjustably securing the auxiliary tail-stock to the bed of the lathe, an arm ajustably mounted on the base, means for adjusting said arm on the base, said arm provided with an aperture centrally aligned with the centers of the lathe, and a disk-like center mounted in the aperture of said arm, said disk-like center provided with a central aperture, a V-shaped projecting annular ring concentric with said central aperture on said center for rotatably supporting the work, and interengaging means on said center and tail-stock for holding said center against rotation and against longitudinal movement away from the work.

JOHN FREDRICK SCHAFFNER.